United States Patent [19]

Davies et al.

[11] Patent Number: 5,581,639
[45] Date of Patent: Dec. 3, 1996

[54] RAMAN-NATH DIFFRACTION GRATING

[75] Inventors: Michael Davies, Ottawa; Jean-Paul Noël, Orléans; Derek Houghton, Gloucester, all of Canada

[73] Assignee: National Research Council of Canada, Ottawa, Canada

[21] Appl. No.: 434,841

[22] Filed: May 4, 1995

[51] Int. Cl.$^6$ ........................................... G02B 6/10
[52] U.S. Cl. ................................. 385/10; 385/14; 385/37
[58] Field of Search .............................. 385/8, 9, 10, 14, 385/37, 129, 130, 131, 132

[56] References Cited

FOREIGN PATENT DOCUMENTS

| | | | |
|---|---|---|---|
| 1-54424 | 3/1989 | Japan | 385/10 |
| 2-222931 | 9/1990 | Japan | 385/10 |

OTHER PUBLICATIONS

Tsai et al; Applied Physics Leters, vol. 26, No. 4, Feb. 15, 1975; pp. 140–142.

"Design Considerations for Rowland Circle Gratings used in Photonic Integrated Devices for WDM Applications" published in Journal of Lightwave Technology, vol. 12, No. 11, Nov. 1994 by Mingcho Wu and Yung Jui Chen.

"Wavelength Precision of Monolithic InP Grating Mulitplexer/demultiplexers" published in Electronics Letters vol. 30 No. 8, Apr. 14, 1994, by J. B. D. Soole, R. Bhat, H. P. LeBlanc, N. C. Andreadakis, P. Grabbe, C. Caneau, and M. A. Koza.

"Demostration of an Integrated multichannel Grating Cavity Laser for WDM Applications" published in Electronics Letters vol. 30 No. 8, Apr. 14, 1994, by M. Asghari, B. Zhu, I. H. White, C. P. Seltzer, C. Nice, I. D. Henning, A. L. Burness, and G. H. B. Thompson.

"Grating Spectrograph Integrated with Photodiode Array in InGaAsP/InGaAs/InP" published in IEEE Photonics Technology Letters, vol. 4, No. 1, Jan. 1992, by C. Cremer, N. Emeis, M. Schier, G. Heise, G. Ebbinghaus, and L. Stoll.

"Demonstration of Low Loss Integrated InGaAsP/InP Demultiplexer Device with Low Polarisation Sensitivity" published in Electronics Letters, vol. 29, No. 9, Apr. 29, 1993, by S. M. Ojha, G. H. B. Thompson, C. G. Cureton, C. B. Rogers, S. J. Clements, M. Asghari and I. H. White.

"8–Channel Optical Demultiplexer Realized as SiO$_2$/Si Flat–Field Spectrograph" published in IEEE Photonics Technology Letters, vol. 6, No. 9, Sep., 1994 by P. C. Clemens, G. Heise, R. Marz, H. Michel, A. Reichelt, and H. W. Schneider.

"WDM Receiver Chip with High Responsivity" published in Electronics Letters vol. 30, No. 19, Sep. 15, 1994, by C. Cremer, M. Schier, G. Baumeister, G. Ebbinghaus, H. Huber, W. Kunkel, J. G. Bauer, G. Kristen, J. Rieger, R. Schimpe, and R. Stzoda.

"High–performance InP Reflection–Grating Wavelength Multiplexer" published in Electronics Letters, vol. 30, No. 6, Mar. 17, 1994, by K. R. Poguntke, J. B. D. Soole, H. P. LeBlanc, N. C. Andreadakis, P. Grabbe, R. Bhat, C. Caneau, and M. A. Koza.

"Wavelength–selectable Laser Emission from a Multistripe Array Grating Integrated Cavity Laser" published in Appl. Phys. Lett. 61 (23), Dec. 7, 1992, by J. B. D. Soole, K. R. Poguntke, A. Scherer, H. P. LeBlanc, C. Chang–Hasnain, J. R. Hayes, C. Caneau, R. Bhat, and M. A. Koza.

"Monolithic InP/InGaAsP/InP Grating Spectrometer for the 1.48–1.56μm Wavelength Range", published in Appl. Phys. Lett. vol. 58, No. 18, May 6, 1991, by J. B. D. Soole, A. Scherer, H. P. LeBlanc, N. C. Andreadakis, R. Bhat, and M. A. Koza.

*Primary Examiner*—John Ngo
*Attorney, Agent, or Firm*—Neil Teitelbaum & Associates

[57] ABSTRACT

An optical wavelength selective device is provided that is particularly useful as a demultiplexer. The device is made from a planar slab optical waveguide material transmissive to light. Perturbations in the form of holes are etched into the slab waveguide cladding or preferably into the core of the waveguide thereby changing the effective refractive index of regions within the core. The holes are very closely spaced and form a transmissive optical grating, having dimensions suitable for operating in the Raman-Nath regime. Mirrors or lenses are formed within the device for guiding an input beam into the waveguide as a parallel light source.

21 Claims, 9 Drawing Sheets

RAMAN-NATH DIFFRACTION GRATING

FIELD THE INVENTION

This invention relates to a transmissive diffraction grating that may be used as a spectrometer, a demultiplexer or a multiplexer.

BACKGROUND ART

In wavelength division multiplexed optical communication systems, many different optical wavelength carriers provide independent communication channels in a single optical fiber. Future computation and communication systems place ever-increasing demands upon communication link bandwidth. It is generally known that optical fibers offer much higher bandwidth than conventional coaxial communications; furthermore a single optical channel in a fiber waveguide uses a microscopically small fraction of the available bandwidth of the fiber (typically a few GHz out of several tens of THz). By transmitting several channels at different optical wavelengths into an fiber (i.e., wavelength division multiplexing, or WDM), this bandwidth may be more efficiently utilized.

There have been many attempts to develop a compact, high resolution waveguide demultiplexer or spectrometer for application in areas such as spectroscopy, optical networks and optical links and more particularly optical communication systems. Such a demultiplexer can be extremely critical in wavelength division multiplexing (WDM) links. In these links or networks, each channel is assigned a distinct and unique wavelength for data transmission.. Thus, the optical fiber that connects channels in a WDM network carries many discrete wavelength channels and a particular wavelength is selected before the data is received. The data reception can be achieved by combining a wavelength demultiplexer, photodetectors and electronic selection circuitries. In WDM links, many wavelengths are multiplexed and transmitted through a single optical fiber to increase the capacity of the fiber. The receiver must demultiplex the many wavelengths and select the proper channel for reception. In these applications, the requirements on the wavelength demultiplexer are typically: an optical bandwidth >30 nm, a wavelength resolution of a few angstroms, polarization insensitivity, compactness, low loss, low crosstalk, and a low manufacturing cost.

At present, there are many known methods of selecting particular wavelengths, however, none are ideal for the applications outlined above. Such methods rely either on bulk optics or waveguide structures where the frequency selective element is either an interference grating or a Fabry-Perot (F-P) cavity. Bulk optics are generally too large and expensive for fiber based WDM applications. Diffraction gratings have been known for many years and produce a high resolution spectrum where the wavelength is a function of the diffracted angle. Thus a single grating can demultiplex many wavelengths. However, available bulk gratings have generally been expensive and difficult to use with optical fibers; another known drawback to these grating is their large physical size.

Techniques for multiplexing and demultiplexing between a single optical fiber comprising the multiplexed channel and plural optical fibers comprising the plural demultiplexed channels are described in various U.S. patents. For example, multiplexing/demultiplexing with birefringent elements is disclosed in U.S. Pat. Nos. 4,744,075 and 4,745,991. Multiplexiing/demultiplexing using optical bandpass filters (such as a resonant cavity) is disclosed in U.S. Pat. Nos. 4,707,064 and 5,111,519. Multiplexing/demultiplexing with interference filters is disclosed in U.S. Pat. Nos. 4,474,424 and 4,630,255 and 4,735,478. Multiplexing/demultiplexing using a prism is disclosed in U.S. Pat. No. 4,335,933. U.S. Pat. No. 4,740,951 teaches a complex sequence of cascaded gratings to demultiplex plural optical signals. U.S. Pat. Nos. 4,756,587 and 4,989,937 and 4,690,489 disclose optical coupling between adjacent waveguides to achieve a demultiplexing function. A similar technique is disclosed in U.S. Pat. No. 4,900,118. Unfortunately, the foregoing techniques are limited by their discrete components to a small number of wavelengths in the multiplexed channel.

One way of overcoming such a limitation is to employ diffraction gratings to perform the multiplexing and demultiplexing functions as is shown by U.S. Pat. Nos. 4,111,524 and 4,993,796. Close spacing of the multiplexed and demultiplexed channels makes fabrication awkward and increases the likelihood of cross-talk. One way of overcoming this latter difficulty is to employ a curved diffraction grating which reflects the incoming signal at right angles. These curved gratings are known as Echelle gratings. Various such gratings are described in U.S. Pat. No. 5,206,920 in the name of Cremer et at; Appl Phys Lett Vol. 58 No. 18 May 1991 p1949 Soole et at; Phot. Tech. Letts. Vol. 4 No.1 1992 p 108 Cremer et at.; Appl Phys Lett Vol. 61 No.23 Dec. 1992 p 2750 Soole et al.; Elec. Letts. March 1994 vol. 30 No. 6 p 512 Poguntke et at.; Elec. Letts. Sept. 1994 Vol. 30 no. 19 p 1625 Cremer et at; and, Phot. Tech. Letts. Vol. 6 no. 9 p 1109 Clemens et al. One of the difficulties associated with the manufacture of Echelle gratings is that they require the etching of high quality facets with well controlled side-wall angle and low rounding. Manufacturing and fabrication precision problems associated with devices of this type are outlined in Journal of Lightwave Tech. Vol. 12 No.11 Nov. 1994 p1939 Wu and Chen; Elec. Letts. April 1994 Vol. 30 No. 8 p 664 Soole et al. This results in higher actual on chip losses (~4 dB) than predicted (~1 dB) on the basis of fabrication tolerances. Furthermore, the lithography of such gratings using focused ion beam or electron beam lithography is very time consuming. If UV lithography is used, the grating must be operated at very high orders.

The foregoing limitation is overcome in a technique in which a diffraction grating is combined with a lens, as disclosed in U.S. Pat. Nos. 4,777,663 and 4,839,884 and 4,367,040 and 4,739,501. The advantage of the lens and grating combination is that the plural optical fibers of the demultiplexed channels may interface directly with the single optical fiber of the multiplexed channel through the grating and lens combination. The problem with the lens and grating combination is that the lens is a large discrete component. Moreover, the diffraction grating itself is typically a discrete component. A related technique is disclosed in U.S. Pat. No. 5,107,359 employing two discrete components, namely either two diffraction gratings or a grating and a specular reflection surface.

Accordingly, the foregoing techniques suffer from drawbacks for integrated circuit implementation and are therefore relatively large expensive devices incapable of exploiting the advantages of integrated circuits in WDM discussed above on a manufacturable scale.

Thus, there is a need for compact, manufacturable wavelength division multiplexing(WDM) device for telecommunications purposes and for other applications such as compact spectrometers which also require similar design.

It is therefore an object of this invention to provide a transmissive refraction grating that is relatively inexpensive to manufacture and compact.

It is a further object of this invention to provide a transmissive refraction grating that operates in the Raman-Nath regime.

SUMMARY OF THE INVENTION

In accordance with an aspect of this invention, an optical wavelength-division demultiplexer is provided, comprising: an optical waveguide having a core and being made of a material that is transmissive to light, the core having a first refractive index, the core having an input end and an output end having a longitudinal light guiding path therebetween, sides of the core being bounded by light guiding regions of a second refractive index for substantially confining light directed into the input end to within the core so that it may propagate to the output end; and, means within the core for changing the effective refractive index of sub-regions within the core, said means substantially preventing light from passing therethrough, said means and a region of the core adjacent said means together forming a transmissive grating operating in a Raman-Nath regime, for passing light incident thereon at an angle, the angle being dependent upon the wavelength of the light incident upon the grating and upon the refractive index difference between the core and the sub-regions within the core. the period of the grating being within the order of the wavelength of light.

In accordance with the invention, there is further provided, an optical wavelength-division demultiplexer for use in an optical multiplex communication, comprising: a planar waveguide having a core and being made of a material that is transmissive to light and having a first refractive index, the core having an input end and an output end, the sides of the core being bounded by light guiding regions for substantially confining light directed into the input end to within the core so that it may propagate to the output end; means within the core having a second refractive index that differs from the first refractive index, said means for substantially perturbing incident light launched into the waveguide and for causing diffraction of said light, said means and the region of the core adjacent said means forming a transmissive grating for demultiplexing a plurality of wavelengths of the incident light, the period of the grating being such that it is within an order of magnitude of at least one of the plurality of the wavelengths of light.

The invention provides a method of manufacturing a wave division demultiplexer or spectrometer which is relatively inexpensive to fabricate. The steps used are compatible with volume manufacturing and automated manufacturing technology. Essentially the design of the WDM device in accordance with an embodiment this invention includes a medium operating as a slab optical waveguide, an input focusing mirror, a transmission diffraction grating operating in the Raman-Nath regime and an output focusing mirror. In operation, the output mirror focuses light onto an array of photodetectors which maybe monolithic or hybrid integrated with the diffracting/focusing components. The design is compatible with GaAs-based, InP-based, Si/SiO$_2$ based or SiGe-based or similar slab waveguides dependent on the wavelength regime chosen for operation. Waveguiding can be either TE or TM propagation.

In another embodiment of the invention, the device described in accordance with the invention can be utilized as a dispersion detector or meter, for determining the intensity of particular wavelengths of light that are separated by the transmissive grating.

In accordance with another aspect of the invention, an optical wavelength selective device is provided, comprising: a slab waveguide having a core made of a light transmissive material;

an optical grating formed within the waveguide by changing the effective refractive index of a plurality of regions within the waveguide, said regions and adjacent areas between said regions forming the grating, the period of the grating being within an order of magnitude of the predetermined wavelengths of light.

BRIEF DESCRIPTION OF THE DRAWINGS

Exemplary embodiments of the invention will be described in conjunction with the drawings in which:

FIG. 2c is the enlarged details of the section enclosed by the circle in FIG. 2a;

FIG. 6a is a pictorial view of an alternative embodiment of a planar waveguide which operates in the Raman-Nath regime having focusing lenses within the waveguide;

FIG. 6b is a cross-sectional view of the embodiment shown in FIG. 6a;

FIG. 6d is the enlarged details of the section enclosed by the circle in FIG. 6a;

DETAILED DESCRIPTION

Figure 1:
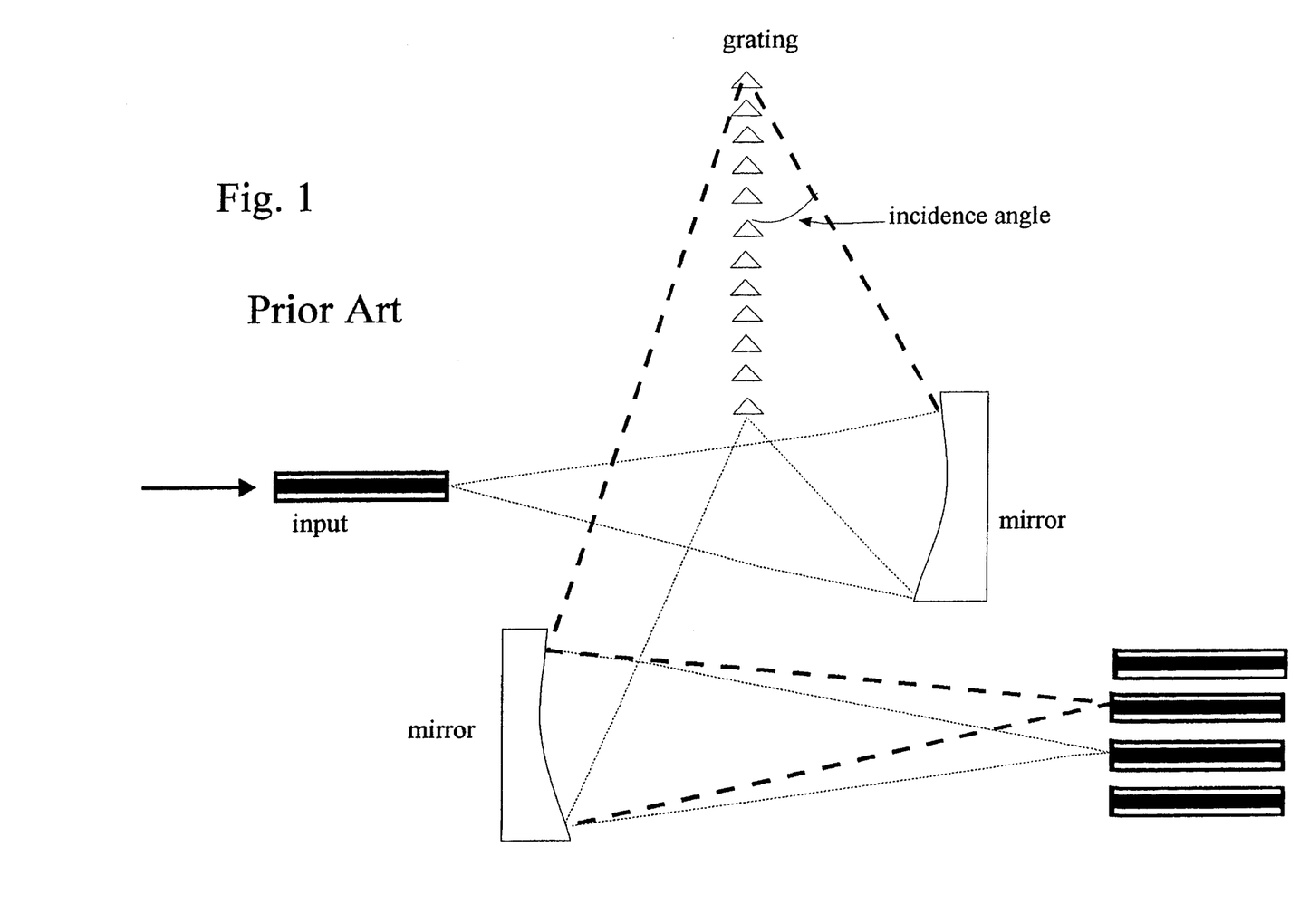
FIG. 1 is an illustration of a prior art Bragg diffraction grating.

Referring now to FIG. 1, a prior art Bragg diffraction grating is shown and is described in detail in a paper entitled "Demonstration of an Integrated Multi-channel Grating Cavity Laser for WDM Applications" by Asghari et al. in Elec. Letts. Sept. 1994 Vol. 30 No. 20 p 1674, is shown. The grating is fabricated to operate in the 1.5 µm wavelength range using InGaAsP/InP material. The grating periodicity is 26 µm and operates in the 89th diffraction order. For a Bragg (thick grating regime) the following expression holds: grating thickness/period of the grating $\gg 10$. In contrast to the device disclosed by Asghari et al., the grating in accordance with this invention functions as a slit transmissive grating operating substantially in the Raman-Nath regime where the following expression holds true: the thickness of the grating/period of the grating $\ll 10$.

Furthermore, in accordance with the instant invention, the period of the grating is in the order of the wavelength of the light incident upon the grating. By way of example, in one embodiment of this invention, the grating is designed top operate in the 1.3 μm wavelength range with the period of the grating being 1.7902 μm, in the order of the wavelength. The advantages of this invention are numerous; for example, the preferred material for an optical wavelength-division demultiplexer described in this invention is Si/SiG$_{0.3}$ which is a relatively inexpensive medium; using currently developed CVD deposition techniques up to 30 wafers can be grown at a time. Thus, manufacturing a large number of these devices is seen to be cost effective.

The following discussion pertains to one particular embodiment of the invention. The values of parameters have been selected to define a grating having an input angle of 30 degrees and an output angle of 45 degrees. By inputting different values into the equations which follow, different input and output angles can be defined.

Figure 2A:
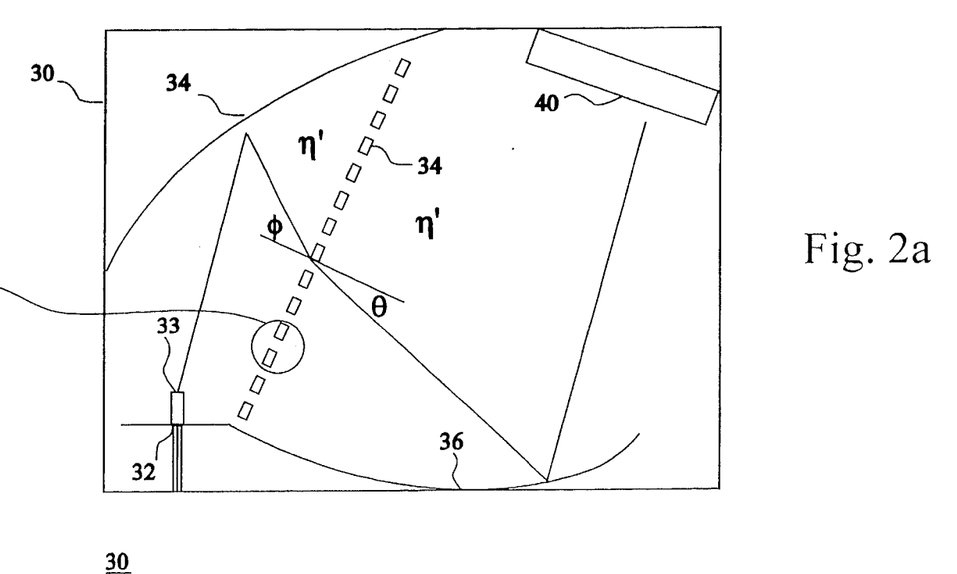
FIG. 2a is a pictorial view of a planar waveguide including diffraction grating which operates in the Raman-Nath regime in accordance with the principles of this invention.
Figure 2B:
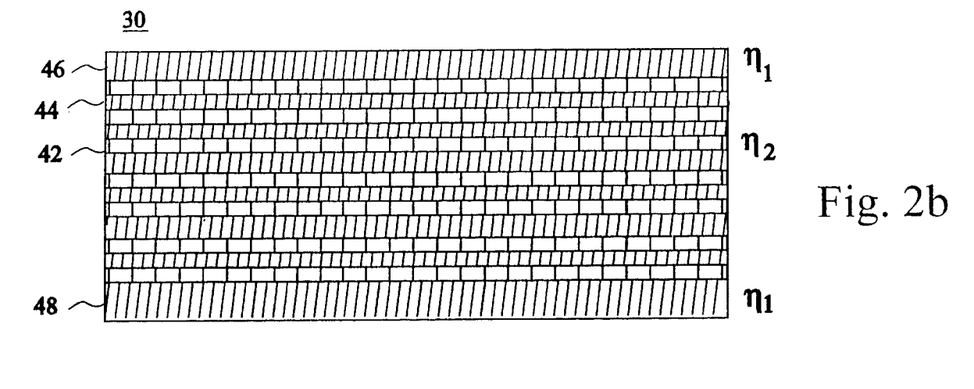
FIG. 2b is a cross sectional side view showing a layer structure of an exemplary device.

In the exemplary embodiment shown in FIG. 2b (not to scale), the layer structure of the device includes a core light guiding region comprised a stack of 7 SiGe$_{0.3}$ quantum wells. Each SiGe$_{0.3}$ well 42 is 100 Å wide and the Si well barriers 44 are 200 Å wide. A 2 μm Si layer 46 provides a top cladding while a 350 micron Si layer 48 provides a second cladding on the bottom. This layer structure yields an effective refractive index of 3.50622. The overall chip dimension (not shown to scale) is approximately 3 mm×13 mm. This small size, yielding excellent wavelength resolution is achieved by appropriately selecting incident angles, and by choosing a transmissive grating with a suitable number of slits, operating in the Raman-Nath regime. As well, the period of the grating must be within the order of the wavelength of light that is to be resolved.

Of course, the waveguide structure in accordance with this invention may comprise other materials such as polymeric materials. A paper entitled "Polymeric Material for Guided-Wave Devices", K. Beeson et al, in SPIE Vol. 1337 Nonlinear Optical Properties of Organic Materials III (1990) P 198., illustrates of the advantages of suitable polymeric materials as passive waveguide structures. Such a structure can be stamped using manufacturing methods similar to optical CD discs.

With reference to FIG. 2a, the geometry of the exemplary device 30 in accordance with this invention will be described.. An input port 32 is shown at the focal point of a parabolic reflective surface in the form of a first mirror 34 (only part of which is shown) defined by the equation $y_1 = x_1^2/4$. A second parabolic mirror 36 defined by the equation $y_2 = x_2^2/20$ is disposed to receive rays of light reflected from the first mirror through a grating 38 and deflects the received rays as physically separated wavelengths of light to an array of detectors 40 positioned at the second mirror's focal point; the detectors in the array are spaced a suitable predetermined distance apart. The longitudinal grating 38 is disposed between the two mirrors 34 and 36 at a predetermined input angle φ=45 degrees. Essentially, the grating is slit transmissive grating formed within the device 30 by removing material and creating holes or bores 34 transverse to the planar light guiding regions of the slab waveguide 30. By forming a plurality of closely spaced holes within the waveguide, the effective refractive index of the planar waveguide in the bore regions changes by ~2 to 2.5 and thus areas or regions are formed which perturb a beam of light launched into the waveguide propagating into the grating. The grating shown in this exemplary embodiment has a selected period of 1790.2 nanometers and a thickness of 200 nanometers. The holes or bores within the waveguide forming the grating can be made in a variety of ways, for example by ion implantation, by focused ion beam (FIB) etching, chemically assisted focused ion beam etching, chemically assisted ion beam etching, reactive ion etching, projection ion beam etching, chemically assisted projection ion beam etching, or by regular etching.

In operation, the purpose of the grating is to perturb or disturb an incident beam of light; thus, etching holes into the cladding region 46 without entering the core will result in a functional device. However, it is preferred that the holes be deep enough to enter or fully extend into the core region of the slab waveguide. Optionally the holes can be filled with an opaque or reflecting material further changing the effective refractive index or other methods can be envisaged that substantailly change the effective refractive index.

Figure 2C:
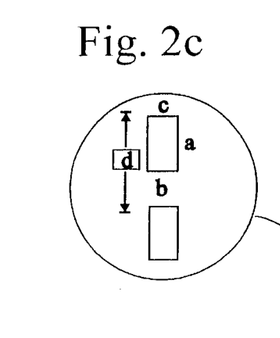

Referring now to the magnified portion of FIG. 2a a detailed illustration of a period "d" of the grating is shown; the spacing of the holes or slits is "a" and the spacing between the holes is "b". The parameter "c" represents thickness or width of the grating.

Figure 3:
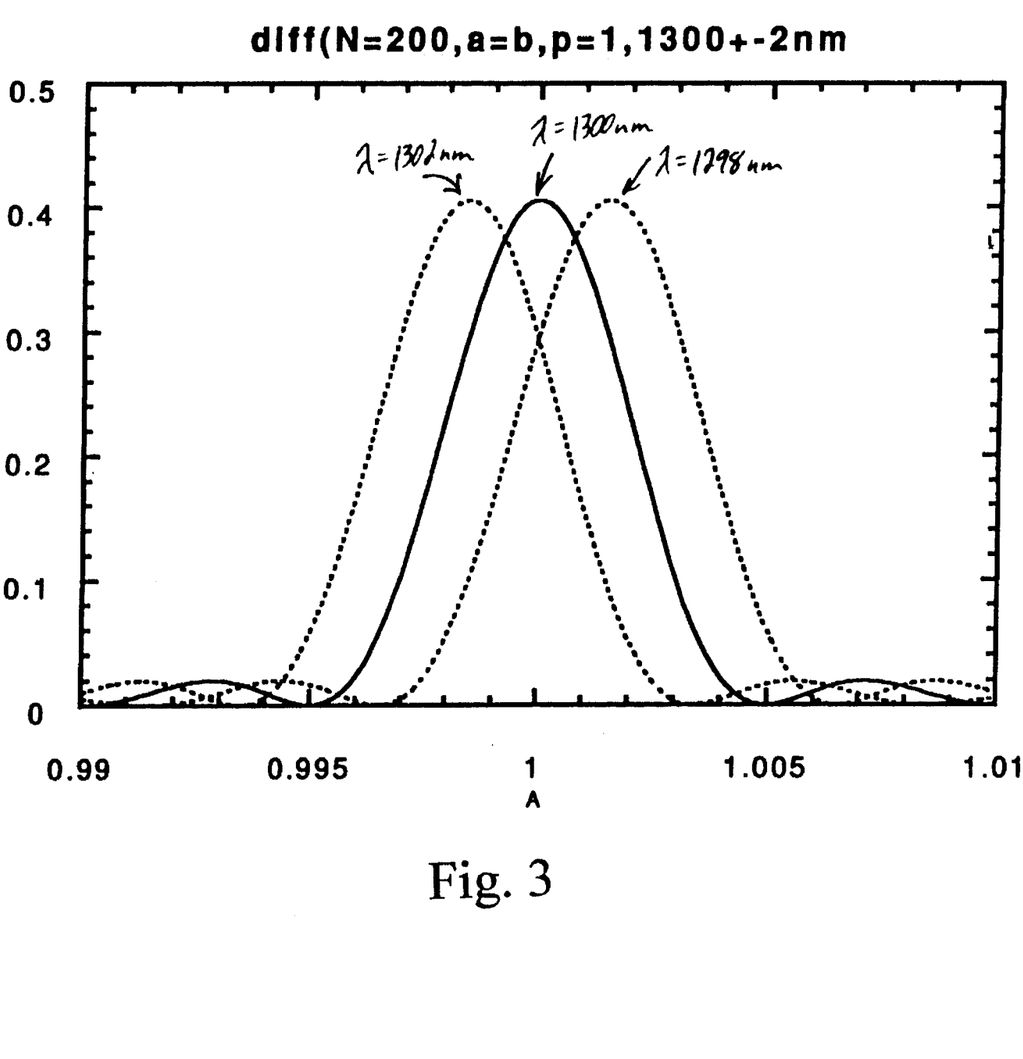
FIG. 3 is a graph showing intensity versus wavelength for a grating having 200 slits.
Figure 4:
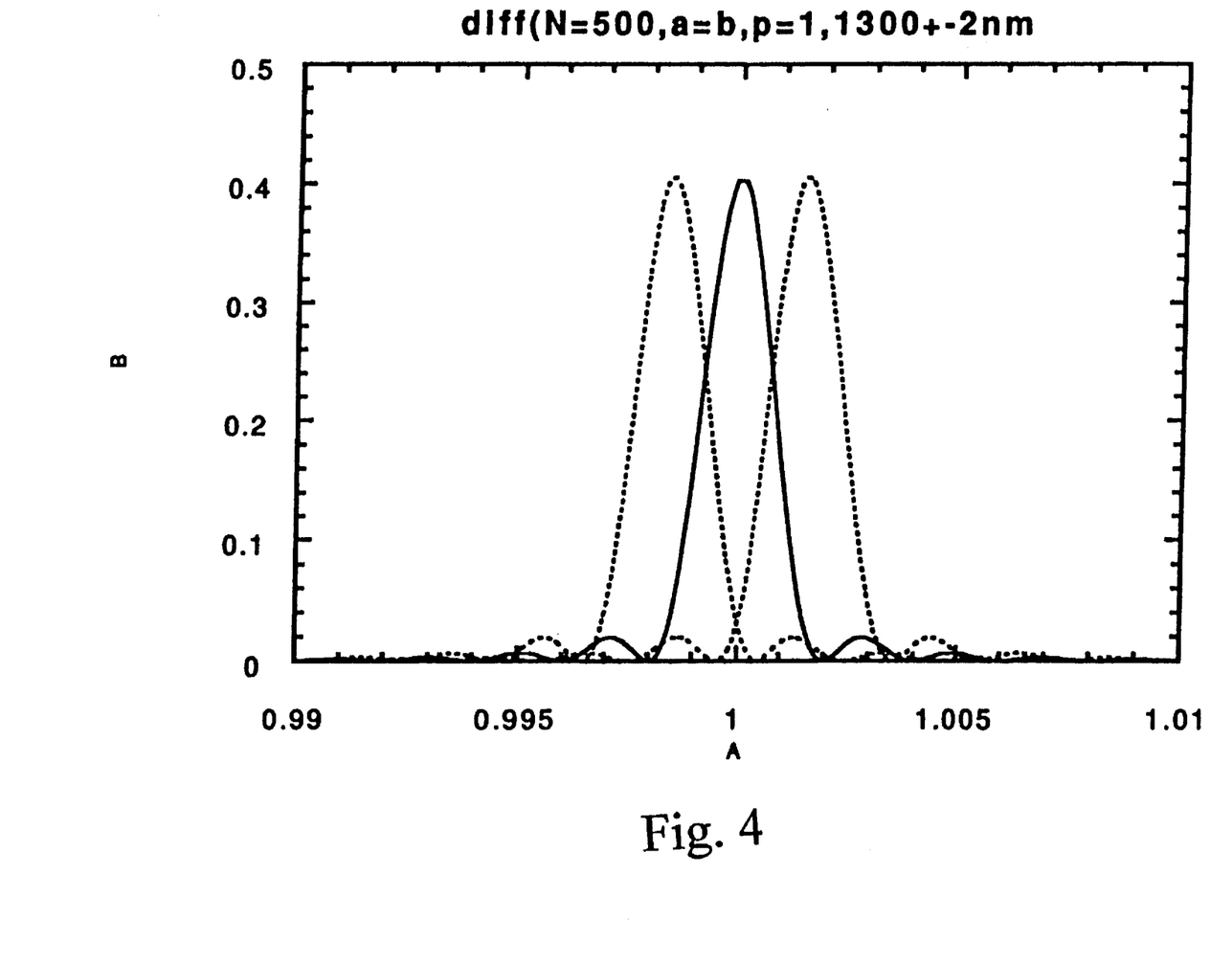
FIG. 4 is a graph showing intensity versus wavelength for a grating having 500 slits.
Figure 5:
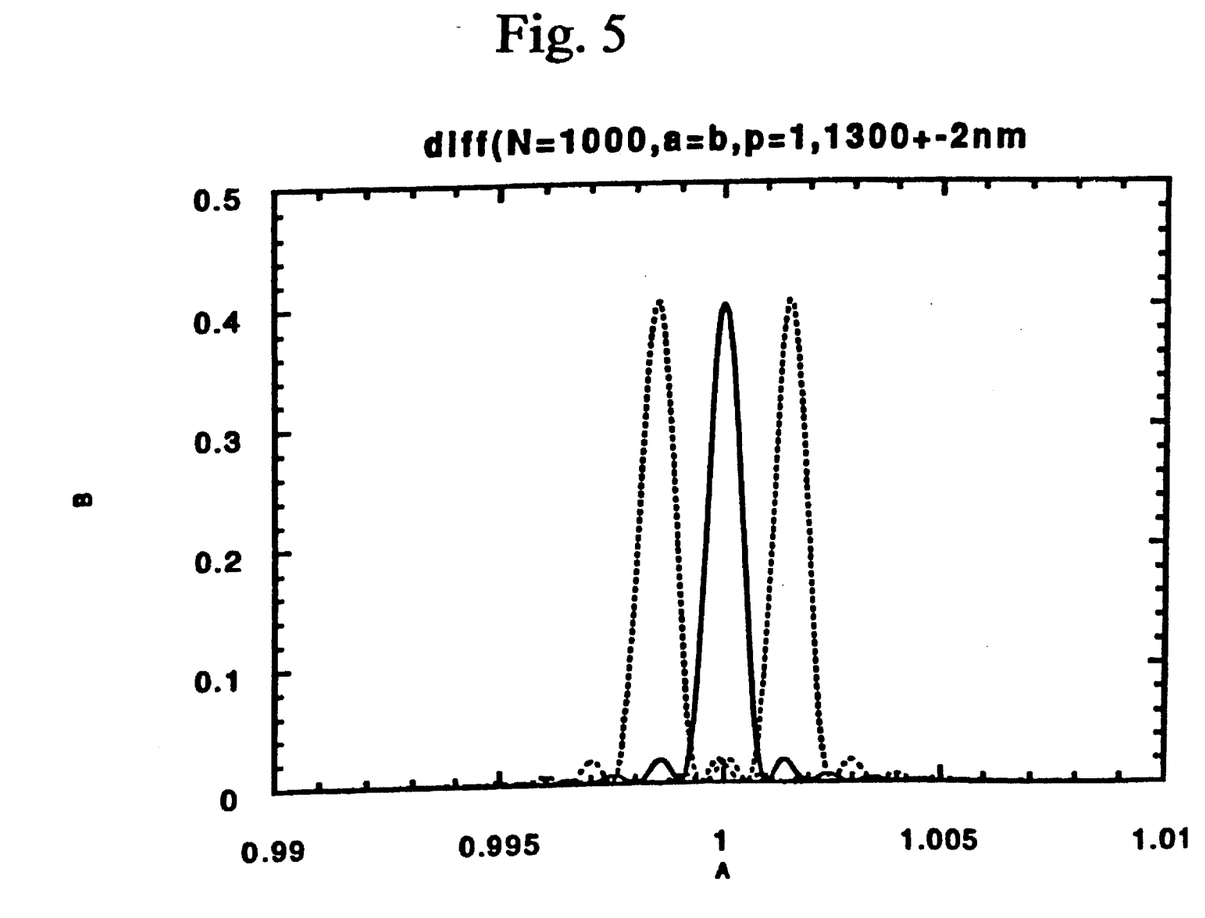
FIG. 5 is a graph showing intensity versus wavelength for a grating having 1000 slits.

By selecting "a" to be approximately equal to "b" both being in the order of "d" which is substantially in the order of the operating wavelength (1.5 μm) "n", the number of holes or slits can be very large, and therefore, the line-width of the grating can be extremely narrow. By substantially adhering to these relationships "c" (the thickness) can be very small allowing a maximal amount of light through the grating, thus making it considerably more efficient than in the Bragg case, where the thickness is more than one order of magnitude greater than the period. Of course increasing the number of holes provides for increased wavelength separation and resolution at the detectors. This is essential in order to eliminate optical cross talk between separate wavelength windows of interest or channels. This becomes evident when referring to FIGS. 3 to 5. The wavelengths being resolved are 1300±2 nm. The separation overlap of the adjacent channels for 200 slits is inferior to a device having 500 slits. In a device having 200 slits the overlap of wavelengths becomes considerable and problematic when attempting to detect or resolve particular wavelengths about a center frequency within a ±2 nm window. For example, with 200 slits, when trying to detect wavelengths centered at 1300±2 nm, the contribution of the 1302±2 nm window overlapping the 1300±2 nm, makes it difficult or impossible to resolve within such a small window. In contrast, the resolution for 1000 slits as is shown in FIG. 5 is considerably better with virtually no overlapping of adjacent 2 nanometer windows. Since "d" is small, it is practicable to manufacture a grating with a large value of "n".

Figures 6A, 6D:
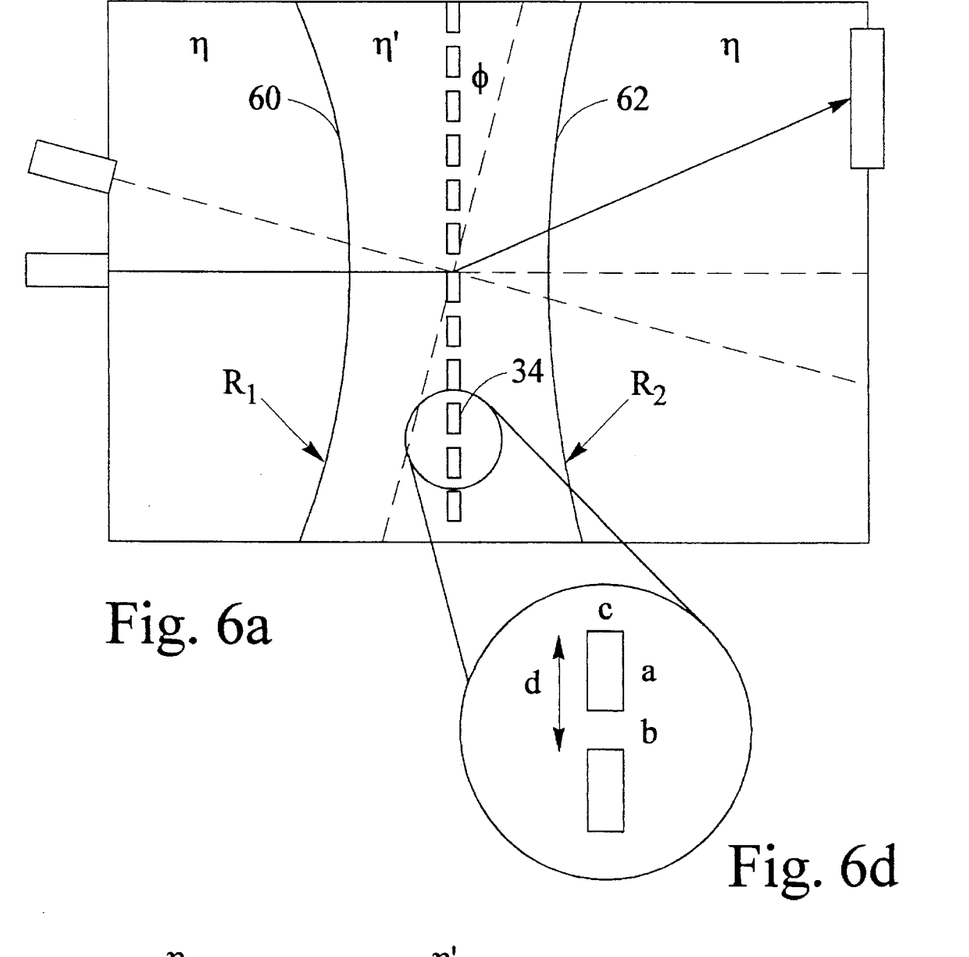
Figure 6B:
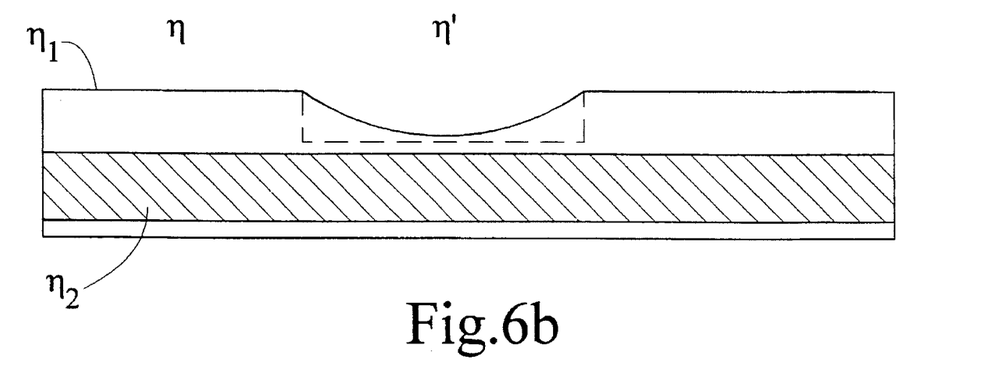

In another embodiment of the invention, shown in FIGS. 6a and 6b, a Raman-Nath grating includes lenses 60 and 62 formed within the waveguide which replace the parabolic reflecting surfaces shown in the previous embodiment of FIG. 2. By fabricating lenses into the waveguide, light can be directed from an input port through the grating, and to the detectors. In a paper entitled "A WDM Receiver Photonic Integrated Circuit With Net On-Chip Gain" by Verdiell M. M. et al, published in IEEE Photonics Technology Letters, Vol. 6 No. 8 August 1994, an integrated Bragg waveguide is shown having an iterated waveguide lens and a planar Bragg grating. Essentially, a lens can be formed by varying the refractive index within a region of the waveguide material. Of course, other means may be envisaged for coupling parallel light into the core of the waveguide directed towards the grating at a predetermined angle.

Figure 6C:
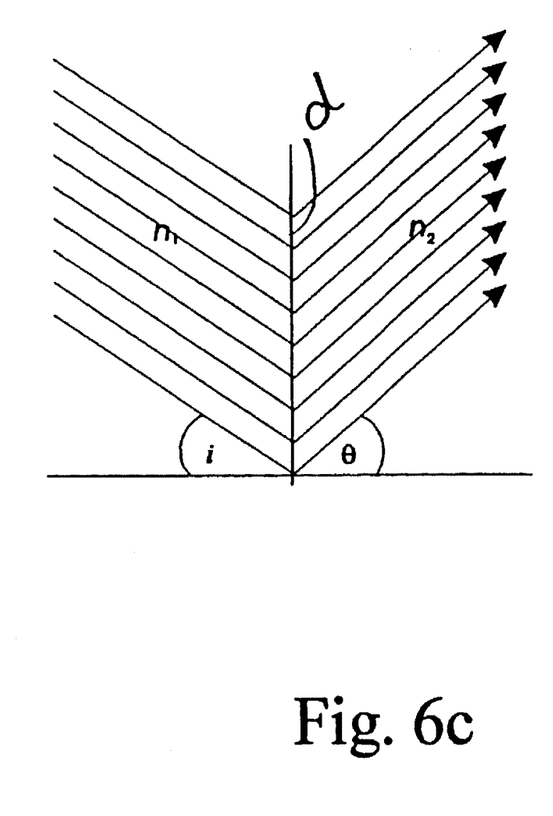
FIG. 6c is an geometric illustration of a collimated beam of light of wavelength $\lambda$ incident upon a grating at an angle i on a grating with a spacing "d"

The geometry of reflection gratings is described by R. S. Longhurst in Geometrical and Physical Optics, 2nd edition, p242–243.

$$d\beta_1 \sin\theta_m - n_2 \sin i\gamma = m\lambda \qquad (1)$$

for a transmission grating where
d=the grating period
$\theta_m$=the angle of the m'th diffracted beam
i=angle of oblique incidence
m=the diffraction mode number
$\lambda$=wavelength Geometrically this is shown in FIG. 6c with a collimated beam of light of wavelength $\lambda$ incident at an angle i on a grating with a spacing "d". It will be seen from the figure that the path difference introduced between disturbances passing through neighboring slits is $d(\sin I - \sin \theta)$. The angle of the mth diffracted beam is $\theta_{m'}$, where $n_1$ and $n_2$ are the refractive indices of the medium on either side of the grating. For a conventional spectrometer in air in transmission, the refractive index for air (n=1) is often omitted from the grating equation.

Thus, for or a reflection grating in air equation (1) becomes $$d\beta \sin\theta_m + \sin i\gamma = m\lambda \qquad (2)$$

For a Bragg, thick, diffraction grating regime the following expression holds: $t/d >> 10$, where "t" is the thickness of the grating and "d" is the period of the grating. In contrast, and according to the principles of this invention, in the thin or Raman-Nath regime then $t/d << 10$.

The diffraction efficiency of the m'th order is given by $$\eta_m = J_m^2 \left( \frac{2\pi \Delta n t}{\lambda \cos i} \right) \qquad (3)$$

$J_m^2$=integer order Bessel function of the first kind
$\lambda$=wavelength
$\Delta n$=modulation amplitude refractive index
t=thickness of grating
For TE polarized light Using these equations, position and intensity of a diffracted beam in the Raman-Nath regime can be calculated. When the diffracted beam is of a low order and the angle of incidence (upon the grating) i.e. 40° to 60° values for "d" and "t" can be selected such that most of the incident light is only in a single mode m=1 as will be shown in a following example accompanied by FIGS. 7, 8, and 9. The dispersion, (i.e. the physical distance between an incident beam of wavelength $\lambda$ and a beam of wavelength $\lambda+d\lambda$,) for a given geometry is dependent upon on the focal length of a focusing element used as well as the diffracting element geometry.

$$\frac{\delta\theta}{\delta\lambda} = \frac{m}{d\cos\theta_m} \qquad (4)$$

Referring to equation (4), for a given small wavelength difference $d\lambda$, the angular separation $\delta\theta$ is proportional to the order of m. Another important aspect that this equation reveals is that $\delta\theta$ is inversely proportional to the sit separation d, usually referred to as the grating space. Consequently, the smaller the grating space the more widely spaced the spectra will be; and, by multiplying equation (4) by the focal length f of the lens forming the spectrum, yields, $$\delta\theta = \frac{\delta l}{f} \qquad (5)$$

Therefore $$\delta l = \frac{mf\delta\lambda}{d\cos\theta_m} \qquad (6)$$

where
$\delta l$=the spacing between rays of different wavelength $\delta\lambda$
m=the diffraction mode number
f=the focal length of the focusing element Hence, by using equations (1) (3) and (6) the position, efficiency, and dispersion of a transmission diffraction grating operating in the Raman-Nath regime in a medium of effective refractive index n can be calculated.

In the example below, a program was written to evaluate these equations using, a commercially available software package, Mathematica™.

By implementing the following program an optimum configuration for a series of input parameters can be determined:
(*All dimensions in nanometers*)

The exemplary values selected to be assigned to the following parameters are.

| | |
|---|---|
| nl=3.50622 | (*effective index of slab guide given the layer structure described above comprising stack of 7 quantum wells of $SiGe_{0.3}$*) |
| deln=(nl-1)/2 | (*refractive index variation*) |
| n2=1+deln | (*average refractive index*) |
| d=200 | (*grating thickness*) |
| lambda=1300 | (*wavelength*) |
| lambda=1790.2 | (*grating period*) |
| f=10000000 | (*focal length of lens*) |

(*print out Raman-Nath condition*)
s::list="Raman-Nath Condition,should be less than 10="
raman=d/lamdag
theta=ArcSin[Sin[x*Degree]-m*lamda/(lamdag*nl)]/Degree
g1=Plot[Evaluate[Table[theta,{m,0,2}]],
{x,0,70},PlotRange->{-90,90},
PlotLabel->"Diffraction Angles"]
Display["Angles",g1]
gam=Pi*deln*d/(lamda*Cos[x*Degree])
g2=Plot[Evaluate[Table[BesselJ[m,2*gam]^2,
{m,0,2}]],{x,0,70},PlotRange->{-0,1},
PlotLabel->"Diffraction Intensity"]
Display["Intensity",g2]
theta=ArcSin[Sin[x*Degree]-m*lamda/(lamdag*n1)]/Degree
dl=2*m*f/(d*Cos[theta*Degree])
g3=Plot[Evaluate[Table[dl,{m,0,2}]],
{x,0,70},PlotRange->{-300000,300000,
PlotLabel->"Dispersion Distance"]
Display["Distances",g3]
(*Calculation of efficiency and angles for Bragg grating using similar values*)
(*It is assumed that the grating is >10 times period ie t/d >10*)
beta=ArcSin[(lamda/(2*lamdag*n2))]
deltheta=Abs[(x*Degree)-beta]
a=deltheta*Pi
b=(Pi*deln*lamdag)/(lamda*Cos[beta])
eta=Sin[Sqrt[a^2+b^2]]^2/(a^2+b^2)
g4=Plot[Evaluate[eta],{x,0,80}, PlotRange->{0,0.1}]
Display["Bragg efficiency",g4]

Figure 7:
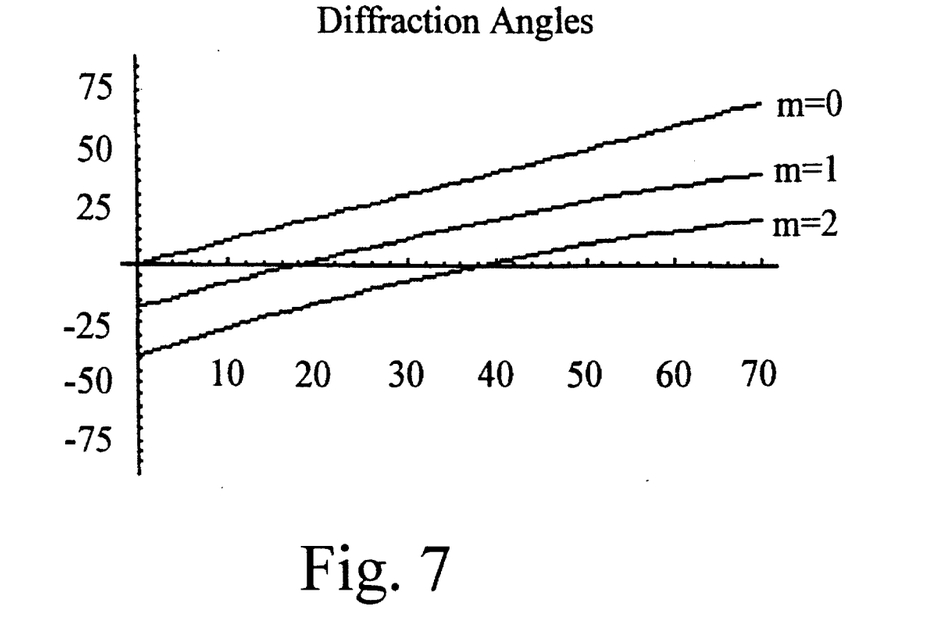
FIG. 7 is a graph of diffraction angle $\theta_m$ versus incident angle I for the Raman-Nath grating of this invention.

Referring now to FIG. 7, the graph shows the variation of the diffraction angle $\theta_m$ as a function of the incidence angle i (equ. 1). Furthermore, the graph shows how many modes can be supported by the grating at various given angles of incidence for the exemplary parameters input into the program described heretofore. Essentially the graph yields the angular position of various modes for the parameters input into the equations above; The upper line intersecting the origin comprises plotted points for the m=0 mode or non-dispersive mode. The line below intersecting the axis at approximately −25 degrees is a plot of points for the m=1 mode, and the lower line below m=1 intersecting the diffraction angle axis at approximately –40 degrees is a plot for the m=2 mode illustrating the change in the diffraction angle $\theta_m$ as a function of the incidence angle i.

Figure 8:
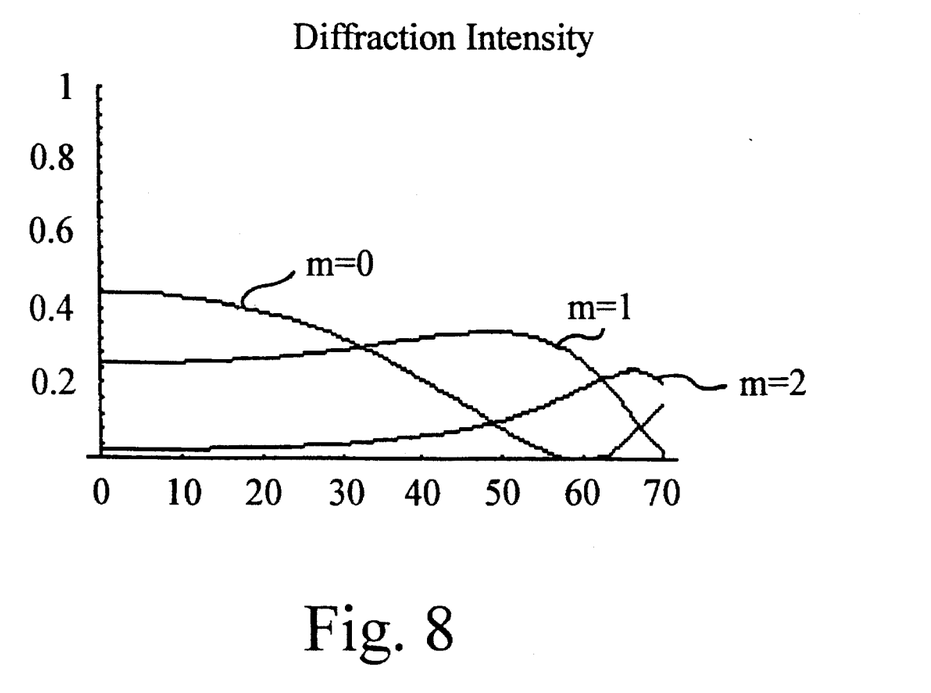
FIG. 8 is a graph of diffraction efficiency for given mode as a function of angle of incidence i for a Raman-Nath grating in accordance with this invention.

Turning now to the graph of FIG. 8, the diffraction efficiency for given mode as a function of angle of incidence i can be seen. For larger oblique angles of incidence, the intensity in the m=0 mode decreases; since the grating can nearly only support a single mode m=1 for the exemplary parameters chosen; thus, most of the light is in the m=1 diffracted mode rather than in the straight through mode m=0.

By comparison if we assume that the grating is a Bragg Reflection grating where the location of the modes are calculated by equation (2), then the efficiency of diffraction can be calculated using $$\eta = \frac{\sin^2(\xi^2 + v^2)^{1/2}}{1 + \frac{\xi^2}{v^2}} \quad (7)$$

where $$\xi = \frac{\Delta\theta 2\pi n_d d \sin\theta_B}{\lambda}$$

$\Delta\theta$ is the misalignment of the incident beam from the Bragg angle $\theta_B$ which is defined by $$2d\sin\theta_B = \frac{\lambda}{n_d}$$

$n_d$ is the refractive index in the grating region $$v = \frac{\pi \Delta n d}{\cos\theta_B \lambda}$$

for TE mode

Figure 9:
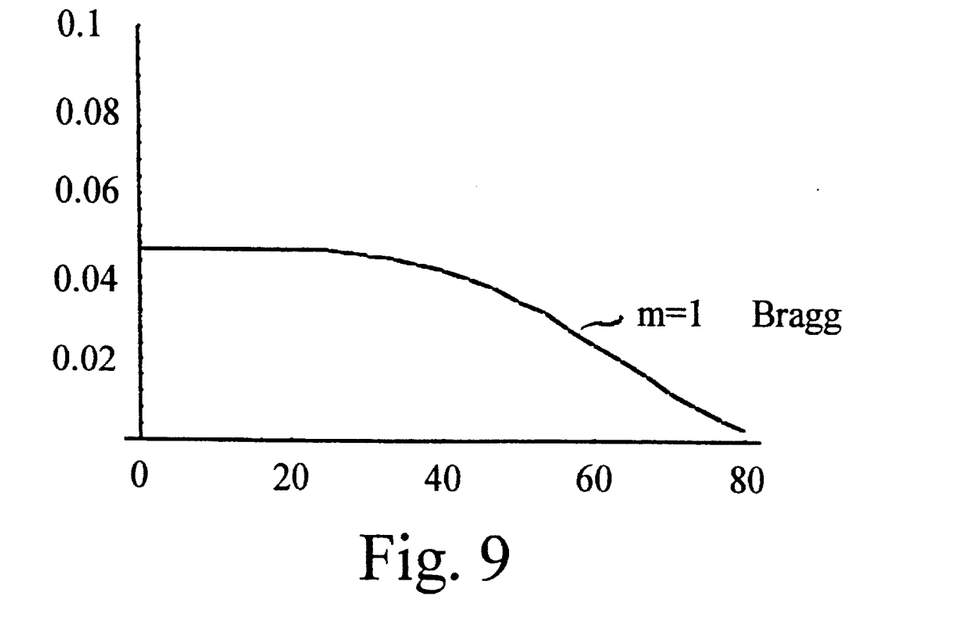
FIG. 9 is a graph of diffraction efficiency for given mode as a function of angle of incidence i for a Bragg diffraction grating; and, FIG. 10 is a graph of dispersion distance (in nanometers) between two wavelengths as a function of angle i.

Therefore the diffraction efficiency can be calculated as function of the incident angle similar to that shown in FIG. 8 and is shown in FIG. 9. It is assumed that m=1 the grating period selected is 1200; to fulfill the assumption that Bragg diffraction occurs t/d>10. The location of the diffracted modes can be calculated using equation 2, with appropriate consideration to refractive indices. Referring now to FIG. 9, the diffraction efficiency for the m=1 mode in the Bragg case is about one tenth of the efficiency shown in the Raman-Nath case.

Figure 10:
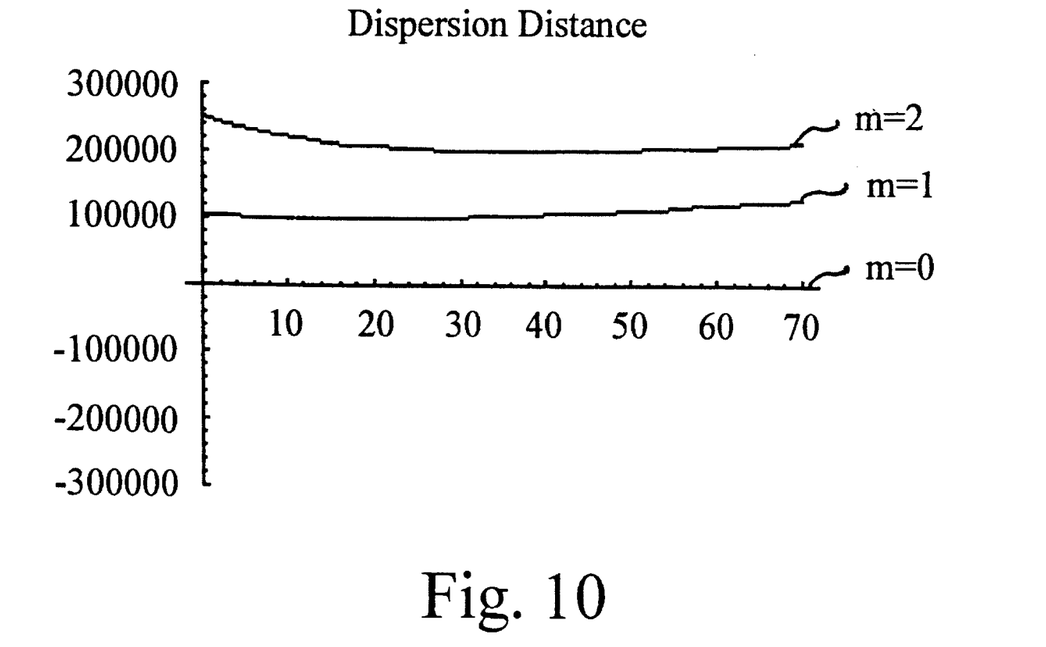

In FIG. 10, the dispersion distance (in nanometers) between two wavelengths as a function of angle i is shown for the m=0 mode, m=1 mode and m=2 mode. As expected, there is no dispersion for m=0 and the plotted values are coincident with the axis of the graph. The dispersion distance for two wavelengths separated by 2 nm is relatively constant for all angles between 0 to 70 degrees at approximately 100 microns.

The method of grating design and manufacture of this invention permits a large number of slits for a given grating size; hence an improved mode profile is obtained resulting in better resolution between closely separated wavelengths. Furthermore, it can be seen from the graphs, that light is localized into only one or two modes due to the high dispersion of the grating, thus resulting in a highly efficient diffracting element.

It should be realized that numerous other embodiments may be envisaged, without departing from the spirit and scope of this invention. For example, the optical wavelength selective device described heretofore, in accordance with this invention, as a demultiplexer, can be designed to operate as a multiplexer. This use of a diffraction grating to provide wavelength selective feedback for a multiple wavelength source has been described by Ashghari et at.

What we claim is:

1. An optical wavelength-division demultiplexer comprising:

a planar optical waveguide having a core and cladding region and being made of a material that is transmissive to light, the core having a first refractive index, the core having an input end and an output end having a longitudinal light guiding path therebetween, sides of the core being bounded by light guiding regions having a second refractive index, the light guiding regions for substantially confining light directed into the input end to within the core so that it may propagate to the output end; and, means within the slab waveguide for changing the effective refractive index of sub-regions within the slab waveguide, said means for substantially perturbing incident light, said means and a region of the slab waveguide adjacent said means together forming a transmissive grating for operating in a Raman-Nath regime, for passing light incident upon the grating at a first angle, at second diffraction angle, the diffraction angle being dependent upon the first angle, the wavelength of the light incident upon the grating and upon the refractive index difference between the waveguide and the sub-regions within the waveguide, the period of the grating being substantially within an order of magnitude of the wavelength of the light incident upon it.

2. An optical wavelength-division demultiplexer as defined in claim 1, wherein the means within the slab waveguide for changing the effective refractive index of sub-regions within the waveguide are within the core of the waveguide, said means and a region of the core adjacent said means together forming the transmissive grating.

3. A optical wavelength-division demultiplexer as defined in claim 2 wherein said grating substantially prevents some of the light incident upon the grating from passing therethrough.

4. An optical wavelength-division demultiplexer as defined in claim 1, wherein the means for changing the effective refractive index comprise a plurality of bores transverse to the axis of propagation of the light incident upon the grating within the optical waveguide.

5. An optical wavelength-division demultiplexer as defined in claim 2, wherein the bores extends through at least the some of the cladding and into the core of the optical waveguide.

6. An optical wavelength-division demultiplexer as defined in claim 2, wherein the plurality of bores are substantially parallel spaced voids within the core region of the optical waveguide.

7. An optical wavelength-division demultiplexer as defined in claim 4, wherein the walls of the bores are coated with a coating that will substantially prevent light from passing therethrough.

8. An optical wavelength-division demultiplexer as defined in claim 4, wherein the plurality of transverse bores are spaced along a line that is transverse to the longitudinal axis of the optical waveguide.

9. An optical wavelength-division demultiplexer as defined in claim 4, wherein the plurality of transverse bores are spaced in an arc to substantially conform to an optical wavefront.

10. An optical wavelength-division demultiplexer as defined in claim 2, wherein the core of the waveguide is comprised of plastic material being substantially transparent to light.

11. An optical wavelength-division demultiplexer as defined in claim 2, wherein the waveguide is comprised of polyimide.

12. An optical wavelength-division demultiplexer as defined in claim 2, wherein the core of the waveguide is substantially comprised of $SiG_{0.3}$, and wherein the sides which clad the core are made of Si.

13. An optical wavelength selective device as defined in claim 1 including means integral with the core for focusing an incoming beam of light onto the transmissive refraction grating.

14. An optical wavelength selective device as defined in claim 13 including means integral within the core, for focusing light that has been transmitted through the grating onto a plurality of spaced detectors.

15. An optical wavelength selective device as defined in claim 14 wherein said means for focusing light comprises two parabolic reflectors.

16. An optical wavelength selective device as defined in claim 1, wherein the number of perturbations exceed 100.

17. An optical wavelength selective device as defined in claim 1, wherein the perturbations comprise substantially equally spaced bores extending into the core, the number of bores being greater than 500.

18. An optical wavelength selective device as defined in claim 1, wherein the number of perturbations exceed 1000.

19. An optical wavelength selective device comprising:

a planar waveguide having a core and being made of a material that is transmissive to light and having a first refractive index, the core having an input end and an output end, the sides of the core being bounded by light guiding regions for substantially confining light directed into the input end to within the core so that it may propagate to the output end;

means within the core having a second refractive index that differs from the first refractive index, said means for substantially perturbing incident light launched into the waveguide and for causing diffraction of said light, said means and the region of the core adjacent said means forming a transmissive grating for demultiplexing a plurality of wavelengths of the incident light, the period of the grating being such that it is within an order of magnitude of at least one of the plurality of the wavelengths of light, wherein the core is comprised of a plurality of $SiG_{0.3}$ quantum wells, well barriers of said wells, being comprised of Si, and wherein the number of perturbations exceed 1000.

20. An optical wavelength selective device as defined in claim 19, wherein the light guiding regions are comprised of Si.

21. An optical wavelength-division demultiplexer as defined in claim 2, including a lens integrally formed within the optical waveguide.

* * * * *